(12) United States Patent
Korb

(10) Patent No.: US 9,091,045 B2
(45) Date of Patent: Jul. 28, 2015

(54) CARTRIDGE ASSEMBLY FOR FAUCET

(71) Applicant: Yaakov Korb, Grafton, OH (US)

(72) Inventor: Yaakov Korb, Grafton, OH (US)

(73) Assignee: Moen Incorporated, North Olmsted, OH (US)

( * ) Notice: Subject to any disclaimer, the term of this patent is extended or adjusted under 35 U.S.C. 154(b) by 0 days.

(21) Appl. No.: 13/804,244

(22) Filed: Mar. 14, 2013

(65) Prior Publication Data
US 2014/0048628 A1    Feb. 20, 2014

Related U.S. Application Data

(60) Provisional application No. 61/684,699, filed on Aug. 17, 2012.

(51) Int. Cl.
| | |
|---|---|
| *F16K 11/087* | (2006.01) |
| *E03C 1/08* | (2006.01) |
| *F16K 3/08* | (2006.01) |
| *F16K 3/32* | (2006.01) |
| *F16K 3/34* | (2006.01) |

(52) U.S. Cl.
CPC ... *E03C 1/08* (2013.01); *F16K 3/08* (2013.01); *F16K 3/32* (2013.01); *F16K 3/34* (2013.01)

(58) Field of Classification Search
CPC ............... F16K 3/08; F16K 3/32; F16K 3/34; E03C 1/08
USPC ................. 137/602, 625.17, 625.28, 625.31, 137/625.41, 603
See application file for complete search history.

(56) References Cited

U.S. PATENT DOCUMENTS

| | | | |
|---|---|---|---|
| 3,810,602 A * | 5/1974 | Parkinson ................. 251/304 |
| 3,957,081 A | 5/1976 | DeWavrin et al. | |
| 4,327,758 A | 5/1982 | Uhlmann | |
| 4,331,176 A | 5/1982 | Parkison | |
| 4,360,040 A * | 11/1982 | Cove et al. ................. 137/625.3 |
| 4,378,029 A | 3/1983 | Parkison | |
| 4,453,567 A | 6/1984 | MacDonald | |
| 4,475,573 A | 10/1984 | Hindman | |
| 4,887,793 A | 12/1989 | Hernandez et al. | |
| 4,944,330 A * | 7/1990 | Sakakibara et al. ..... 137/625.31 |
| 5,058,860 A | 10/1991 | Grassberger | |
| 5,107,884 A | 4/1992 | Orlandi | |
| 5,127,438 A * | 7/1992 | Williams ................. 137/625.31 |
| 5,150,737 A | 9/1992 | Clerc | |
| 5,213,134 A | 5/1993 | Orlandi | |
| 5,853,023 A * | 12/1998 | Orlandi et al. ................. 137/271 |
| 5,857,489 A | 1/1999 | Chang | |
| 6,517,006 B1 | 2/2003 | Knapp | |
| 7,111,643 B2 | 9/2006 | Oh | |
| 8,281,814 B2 * | 10/2012 | Kim .......................... 137/637.3 |
| 2008/0178951 A1 * | 7/2008 | Frackowiak et al. .... 137/625.41 |
| 2008/0179559 A1 * | 7/2008 | Kacik ............................ 251/231 |
| 2009/0025800 A1 * | 1/2009 | Lopp et al. ................. 137/454.6 |

OTHER PUBLICATIONS

Cartridge Products Maximum Flow Rate Data, the cartridge products used to generate the maximum flow rate data shown in the cited document were publicly available prior to Aug. 17, 2012, 1 page.
Cartridge Products Flow Modulation Data, the cartridge products used to generate the flow modulation data shown in the cited document were publicly available prior to Aug. 17, 2012, 2 pages.
Cartridge Products Flow Modulation Curve, the cartridge products used to generate the flow modulation curve shown in the cited document were publicly available prior to Aug. 17, 2012, 1 page.
International Search Report for International App. No. PCT/US2013/050494 dated Apr. 8, 2014 (2 pages).
Written Opinion of the International Searching Authority for International App. No. PCT/US2013/050494 dated Apr. 8, 2014 (7 pages).

* cited by examiner

*Primary Examiner* — Jessica Cahill
(74) *Attorney, Agent, or Firm* — Calfee, Halter & Griswold LLP

(57) ABSTRACT

The present invention provides a cartridge assembly for a faucet that provides improved flow rate, flow modulation, and particulate passage.

24 Claims, 15 Drawing Sheets

MAXIMUM FLOW RATE DATA

| FLOWING PRESSURE ( psi ) | MAXIMUM FLOW RATE ( GPM ) |
|---:|---:|
| 0 | 0 |
| 10 | 2.94 |
| 20 | 4.18 |
| 30 | 5.09 |
| 40 | 5.83 |
| 50 | 6.49 |
| 60 | 7.09 |
| 70 | 7.64 |
| 80 | 8.14 |
| 90 | 8.62 |
| 100 | 9.08 |
| 110 | 9.48 |

FIG. 9

FLOW MODULATION DATA

| HANDLE / STEM POSITION (DEGREE OF ROTATION) | FLOW RATE (GPM) |
|---:|---:|
| 0 | 0 |
| 5 | 0 |
| 10 | 0.04 |
| 15 | 0.06 |
| 20 | 0.28 |
| 25 | 0.48 |
| 30 | 0.7 |
| 35 | 0.94 |
| 40 | 1.32 |
| 45 | 1.9 |
| 50 | 2.43 |
| 55 | 3.46 |
| 60 | 4.1 |
| 65 | 4.68 |
| 70 | 5.11 |
| 75 | 5.31 |
| 80 | 5.6 |
| 85 | 5.89 |
| 90 | 6.06 |
| 95 | 5.89 |
| 100 | 5.67 |
| 105 | 5.41 |
| 110 | 5.12 |
| 115 | 4.67 |
| 120 | 4.16 |
| 125 | 3.37 |
| 130 | 2.49 |
| 135 | 1.82 |
| 140 | 1.45 |
| 145 | 1.01 |
| 150 | 0.75 |
| 155 | 0.56 |
| 160 | 0.32 |
| 165 | 0.1 |
| 170 | 0 |
| 175 | 0 |
| 180 | 0 |

FIG. 10

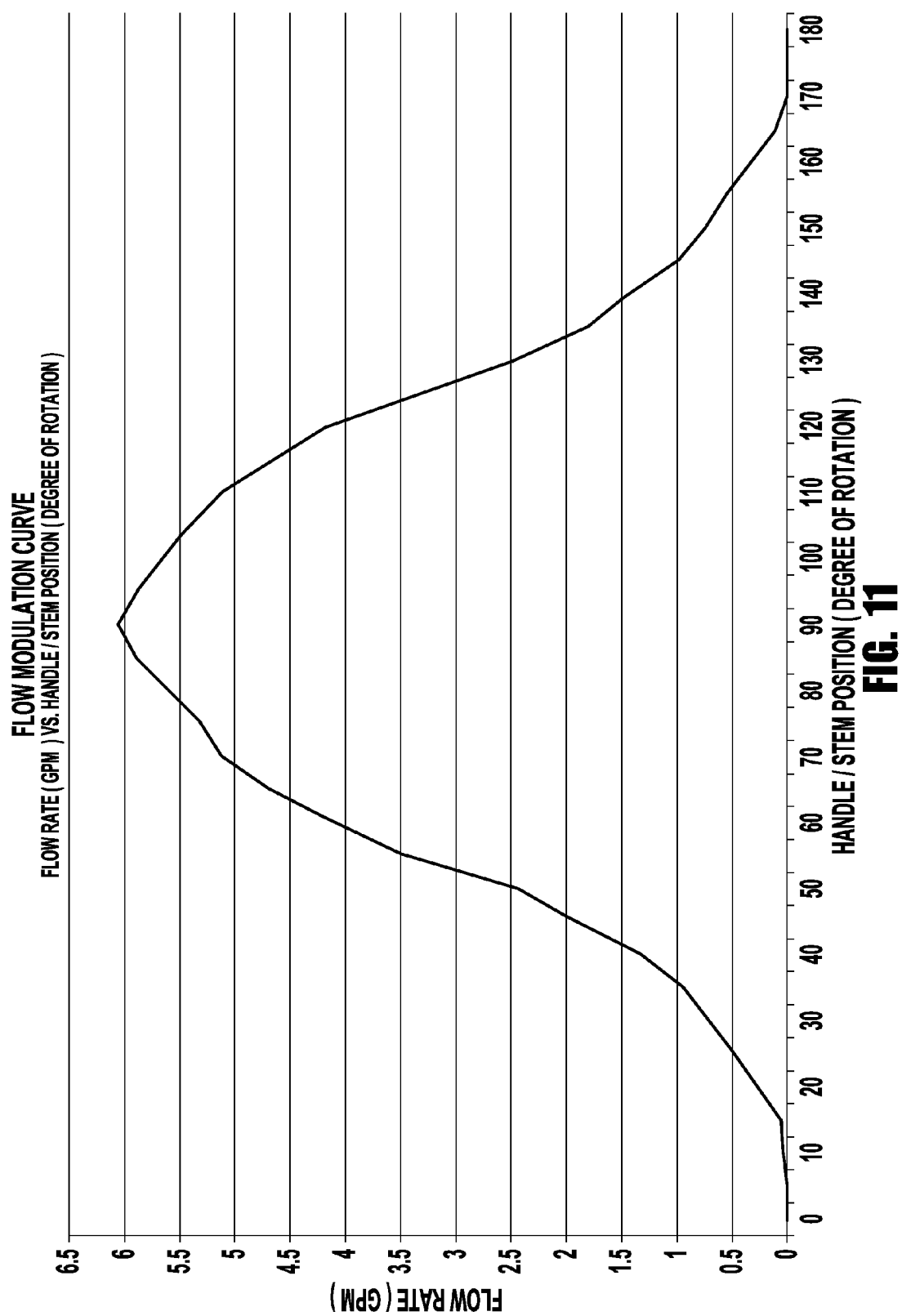

CARTRIDGE ASSEMBLY FOR FAUCET

CROSS-REFERENCE TO RELATED APPLICATION

This application claims the benefit of U.S. Provisional Application No. 61/684,699, filed Aug. 17, 2012, the entire disclosure of which is hereby incorporated by reference.

FIELD

The present invention relates generally to a cartridge assembly for a faucet, and, more particularly, to a cartridge assembly for a faucet that provides improved flow rate, flow modulation, and particulate passage.

BACKGROUND

In a faucet, disks are installed in a cartridge assembly for the faucet. The size and shape of the openings in the disks determine the flow rate, the flow modulation, and the particulate passage through the cartridge assembly. Prior disks typically optimize one of these features while compromising the other features.

SUMMARY

The present invention provides a cartridge assembly for a faucet that provides improved flow rate, flow modulation, and particulate passage.

In an exemplary embodiment, the cartridge assembly includes a cartridge shell. The cartridge shell includes a first end and a second end. The cartridge shell has an exterior surface. The cartridge shell has an interior. The cartridge shell includes a pair of openings extending from the interior through the exterior surface between the first end and the second end. The cartridge assembly includes a stem. The stem is operable to be at least partially disposed within the cartridge shell. The cartridge assembly includes a moveable disk. The moveable disk is operable to be disposed within the cartridge shell. The moveable disk includes a top side and a bottom side. The moveable disk further includes a pair of openings extending from the top side through the bottom side. The openings in the moveable disk are symmetrical across a center line of the openings. The cartridge assembly includes a fixed disk. The fixed disk is operable to be disposed within the cartridge shell. The fixed disk includes a top side and a bottom side. The fixed disk further includes a pair of openings extending from the top side through the bottom side. The openings in the fixed disk are symmetrical across a center line of the openings. The stem is operable to be connected to the moveable disk so that rotation of the stem causes rotation of the moveable disk. The bottom side of the moveable disk is operable to abut the top side of the fixed disk. Flow through the cartridge assembly flows through the openings in the fixed disk and through the openings in the moveable disk and exits through the openings in the cartridge shell. The openings in the moveable disk and the openings in the fixed disk are configured so that a flow rate through the cartridge assembly, at three bars of flowing pressure, from an open position at a stem rotation of approximately fifteen degrees to an open position at a stem rotation of approximately seventy-five degrees, follows an S-curve.

In another exemplary embodiment, the cartridge assembly includes a cartridge shell. The cartridge shell includes a first end and a second end. The cartridge shell has an exterior surface. The cartridge shell has an interior. The cartridge shell includes a pair of openings extending from the interior through the exterior surface between the first end and the second end. The cartridge assembly includes a stem. The stem is operable to be at least partially disposed within the cartridge shell. The cartridge assembly includes a moveable disk. The moveable disk is operable to be disposed within the cartridge shell. The moveable disk includes a top side and a bottom side. The moveable disk further includes a pair of openings extending from the top side through the bottom side. The openings in the moveable disk are symmetrical across a center line of the openings. The cartridge assembly includes a fixed disk. The fixed disk is operable to be disposed within the cartridge shell. The fixed disk includes a top side and a bottom side. The fixed disk further includes a pair of openings extending from the top side through the bottom side. The openings in the fixed disk are symmetrical across a center line of the openings. The stem is operable to be connected to the moveable disk so that rotation of the stem causes rotation of the moveable disk. The bottom side of the moveable disk is operable to abut the top side of the fixed disk. Flow through the cartridge assembly flows through the openings in the fixed disk and through the openings in the moveable disk and exits through the openings in the cartridge shell. The openings in the moveable disk and the openings in the fixed disk are configured so that a flow rate through the cartridge assembly, at three bars of flowing pressure, from an open position at a stem rotation of approximately fifteen degrees to an open position at a stem rotation of approximately forty-five degrees, increases along a gradual upwardly sloped curve. The openings in the moveable disk and the openings in the fixed disk are configured so that a flow rate through the cartridge assembly, at three bars of flowing pressure, from the open position at the stem rotation of approximately forty-five degrees to an open position at a stem rotation of approximately seventy-five degrees, increases along a steep upwardly sloped curve.

In another exemplary embodiment, the cartridge assembly includes a cartridge shell. The cartridge shell includes a first end and a second end. The cartridge shell has an exterior surface. The cartridge shell has an interior. The cartridge shell includes a pair of openings extending from the interior through the exterior surface between the first end and the second end. The cartridge assembly includes a stem. The stem is operable to be at least partially disposed within the cartridge shell. The cartridge assembly includes a moveable disk. The moveable disk is operable to be disposed within the cartridge shell. The moveable disk includes a top side and a bottom side. The moveable disk further includes a pair of openings extending from the top side through the bottom side. The openings in the moveable disk are symmetrical across a center line of the openings. The cartridge assembly includes a fixed disk. The fixed disk is operable to be disposed within the cartridge shell. The fixed disk includes a top side and a bottom side. The fixed disk further includes a pair of openings extending from the top side through the bottom side. The openings in the fixed disk are symmetrical across a center line of the openings. The stem is operable to be connected to the moveable disk so that rotation of the stem causes rotation of the moveable disk. The bottom side of the moveable disk is operable to abut the top side of the fixed disk. Flow through the cartridge assembly flows through the openings in the fixed disk and through the openings in the moveable disk and exits through the openings in the cartridge shell. The openings in the moveable disk and the openings in the fixed disk are configured so that there are two zones of control. In a first zone, from an open position at a stem rotation of approximately fifteen degrees to an open position at a stem rotation of approximately forty-five degrees, a flow rate increases at a gradual rate and there is a high degree of control over flow modulation. In a second zone, from the open position at the stem rotation of approximately forty-five degrees to an open position at a stem rotation of approximately seventy-five degrees, a flow rate increases at a steep rate and there is a low degree of control over flow modulation.

BRIEF DESCRIPTION OF THE DRAWINGS

-FIG. 6a is a top plan view, FIG. 6b is a bottom plan view, FIG. 6c is a front elevational view, and FIG. 6d is a side elevational view;

-FIG. 7a is a bottom plan view, FIG. 7b is a top plan view, FIG. 7c is a front elevational view, and FIG. 7d is a side elevational view;

—FIG. 8a is at zero degrees (0°) rotation, FIG. 8b is at ten degrees (10°) rotation, FIG. 8c is at twenty degrees (20°) rotation, FIG. 8d is at thirty degrees (30°) rotation, FIG. 8e is at forty degrees (40°) rotation, FIG. 8f is at fifty degrees (50°) rotation, FIG. 8g is at sixty degrees (60°) rotation, FIG. 8h is at seventy degrees (70°) rotation, FIG. 8i is at eighty degrees (80°) rotation, and FIG. 8j is at ninety degrees (90°) rotation;

FIG. 9 is a chart showing maximum flow rate data for the cartridge assembly of FIG. 2, including the moveable disk of FIGS. 6a-6d and the fixed disk of FIGS. 7a-7d;

FIG. 10 is a chart showing flow modulation data for the cartridge assembly of FIG. 2, including the moveable disk of FIGS. 6a-6d and the fixed disk of FIGS. 7a-7d; and FIG. 11 is a graph showing a flow modulation curve for the flow modulation data of FIG. 10.

DETAILED DESCRIPTION

The present invention provides a cartridge assembly for a faucet that provides improved flow rate, flow modulation, and particulate passage. An exemplary embodiment of a cartridge assembly 10 of the present invention is shown in FIGS. 1-5.

Figure 1:
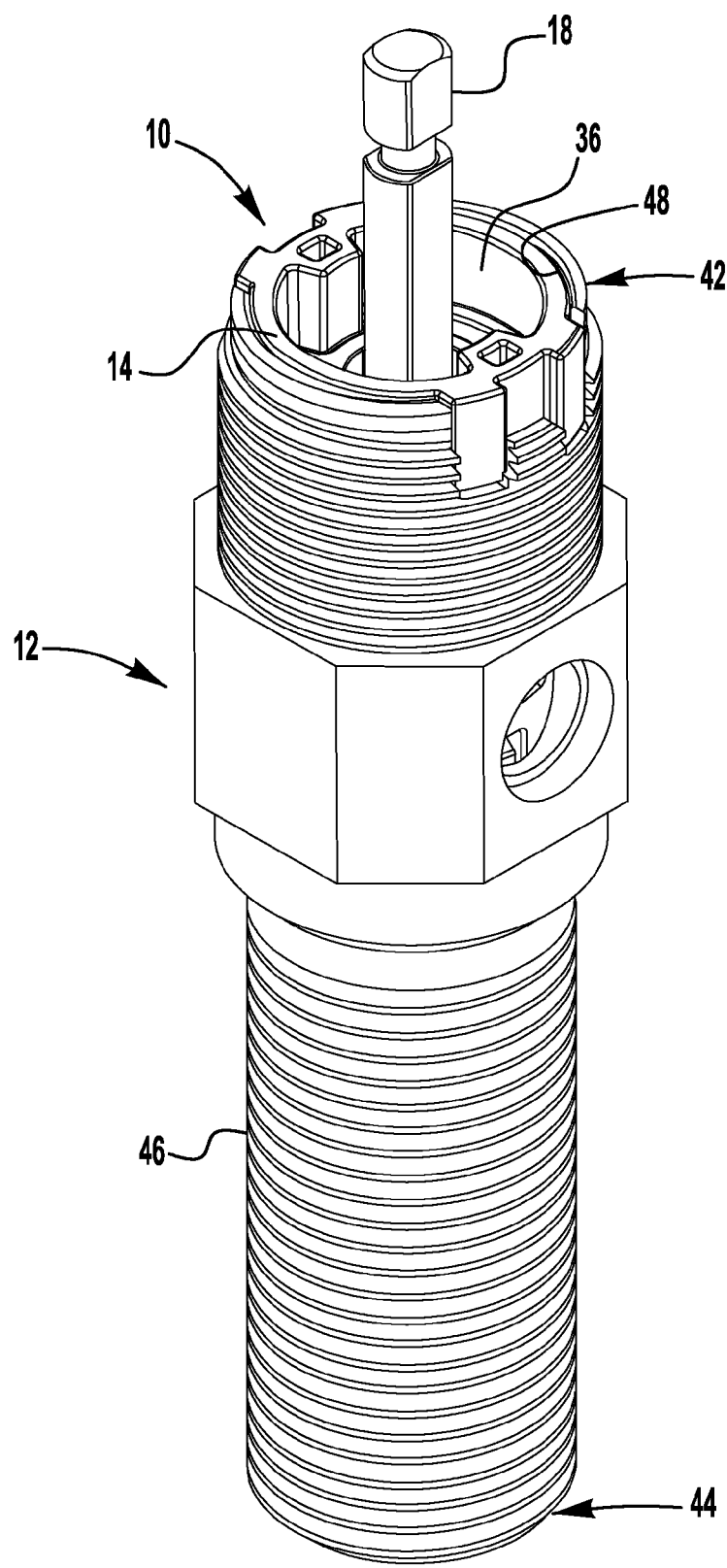
FIG. 1 is a perspective view of a cartridge assembly installed in a valve body according to an exemplary embodiment of the present invention.

In an exemplary embodiment, as illustrated in FIG. 1, the cartridge assembly 10 is installed in a valve body 12. In an exemplary embodiment, as illustrated in FIGS. 2-5, the cartridge assembly 10 includes a cartridge shell 14, a stem seal 16, a stem 18, a moveable disk 20, a fixed disk 22, a base seal 24, a base seal support 26, and a shell seal 28. Cartridge assemblies and valve bodies are well-known in the art and, therefore, only the relevant components of the cartridge assembly 10 and the valve body 12 will be described in greater detail.

Figure 4:
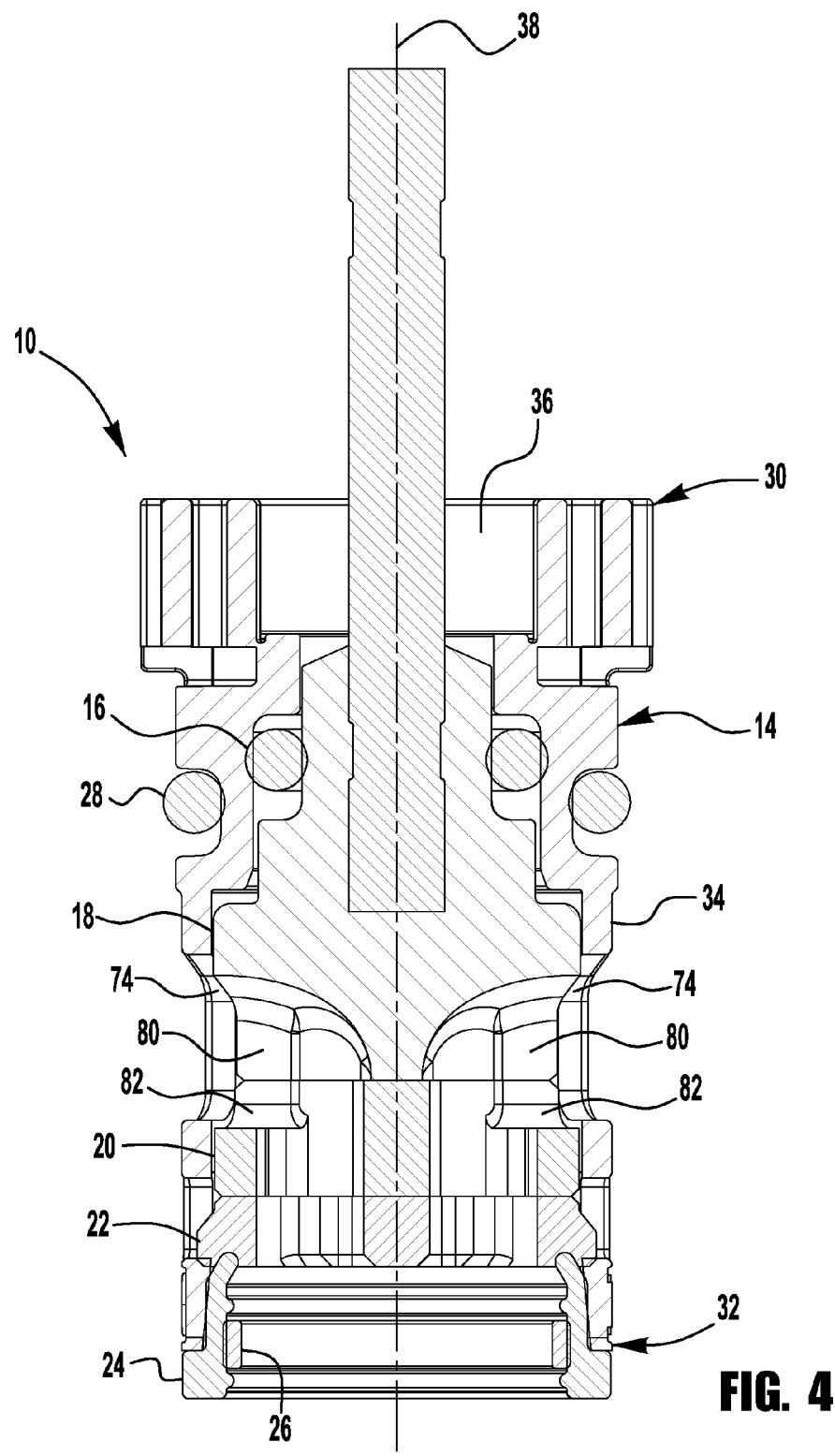
FIG. 4 is a cross-sectional view of the cartridge assembly of FIG. 2 along the line A-A in FIG. 3.
Figure 5:
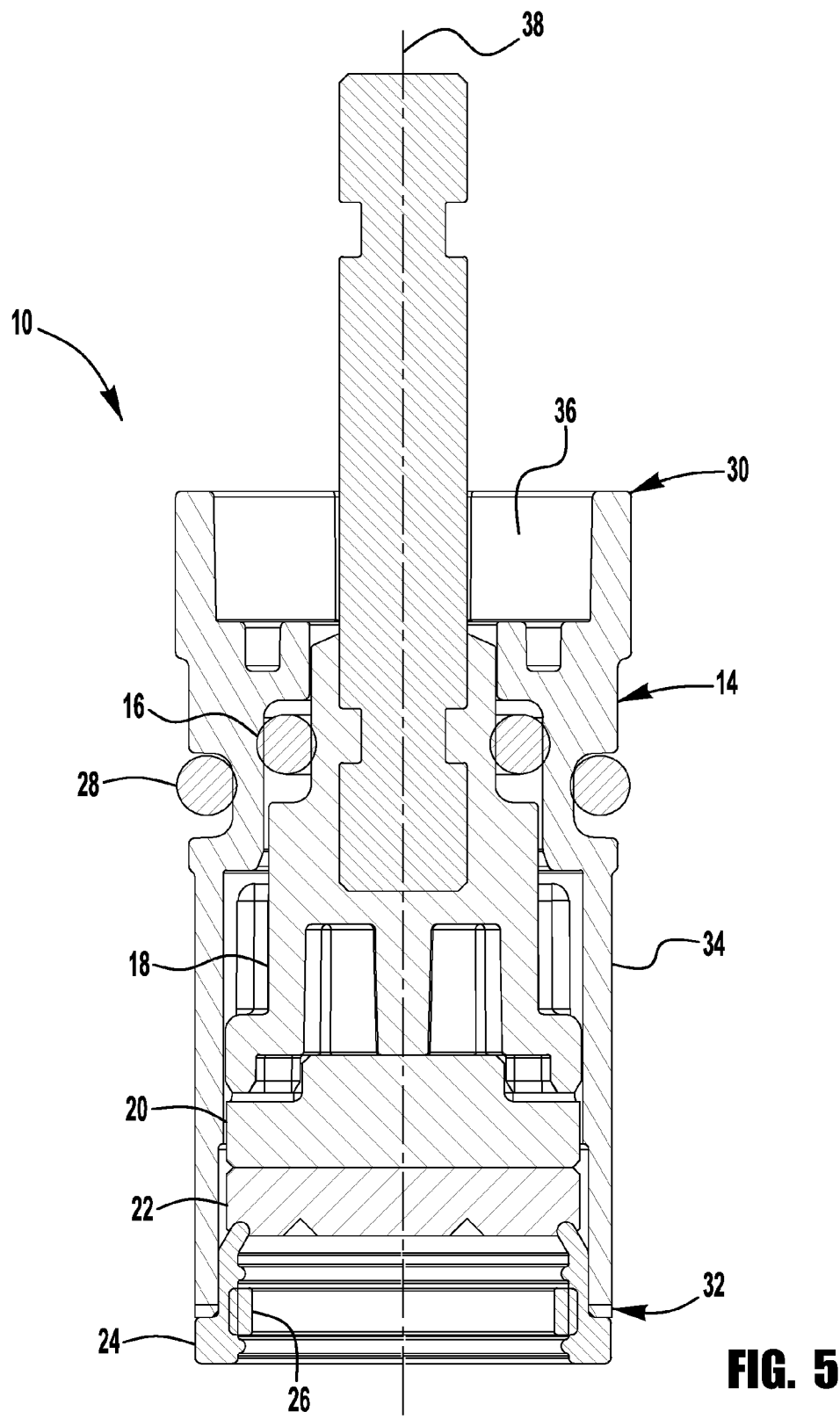
FIG. 5 is a cross-sectional view of the cartridge assembly of FIG. 2 along the line B-B in FIG. 3.
Figure 6A:
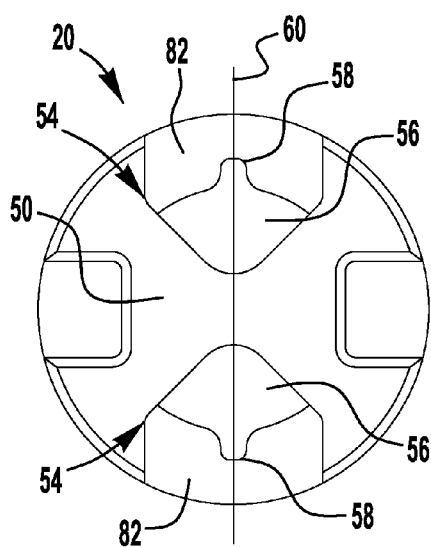
FIGS. 6a-6d are views of the moveable disk of FIG. 2
Figure 6B:
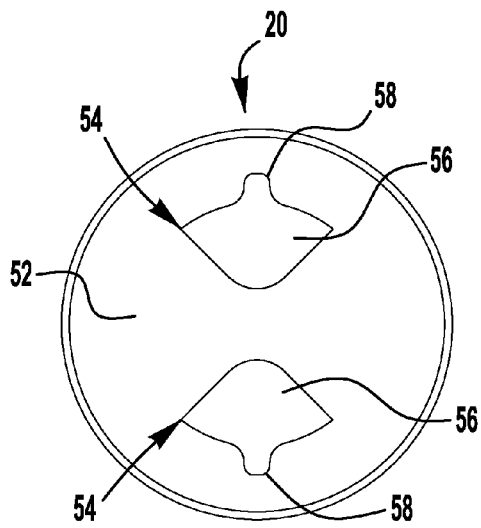
Figure 6C:
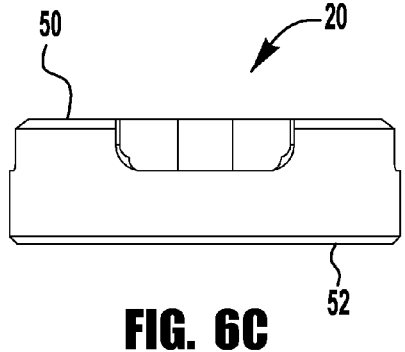
Figure 6D:
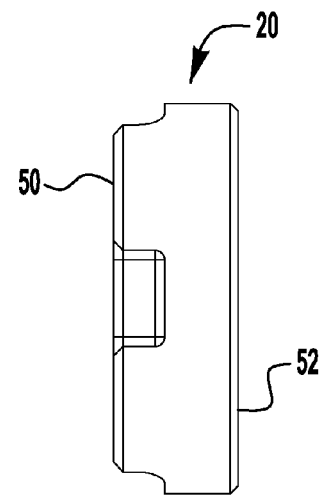
Figure 7A:
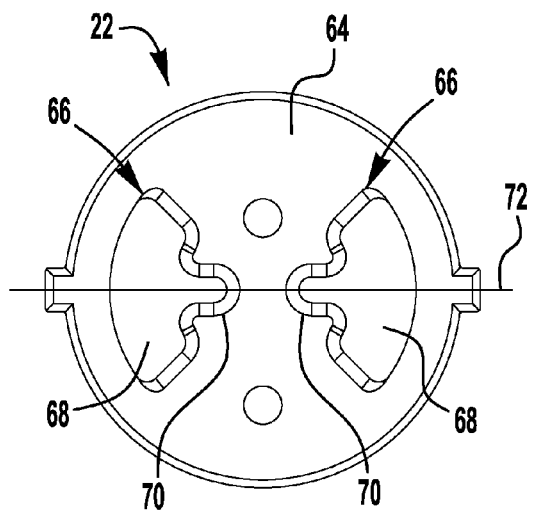
FIGS. 7a-7d are views of the fixed disk of FIG. 2
Figure 7B:
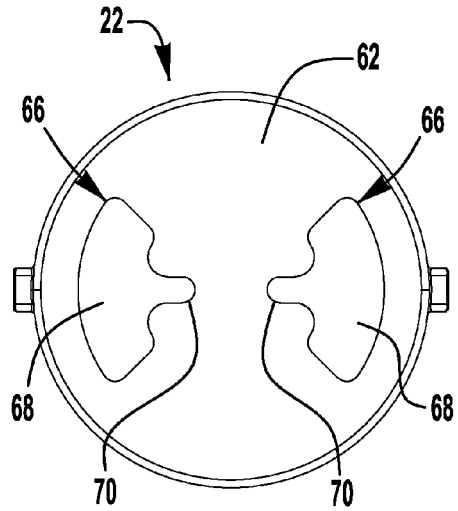
Figure 7C:
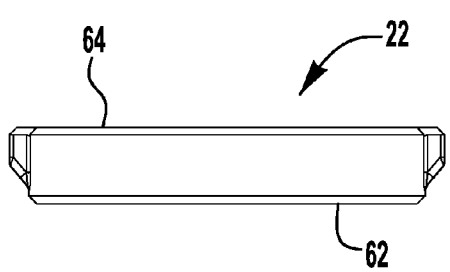
Figure 7D:
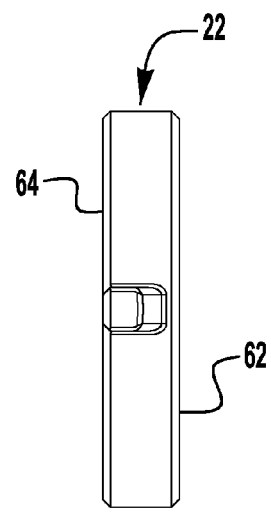
Figure 8A:
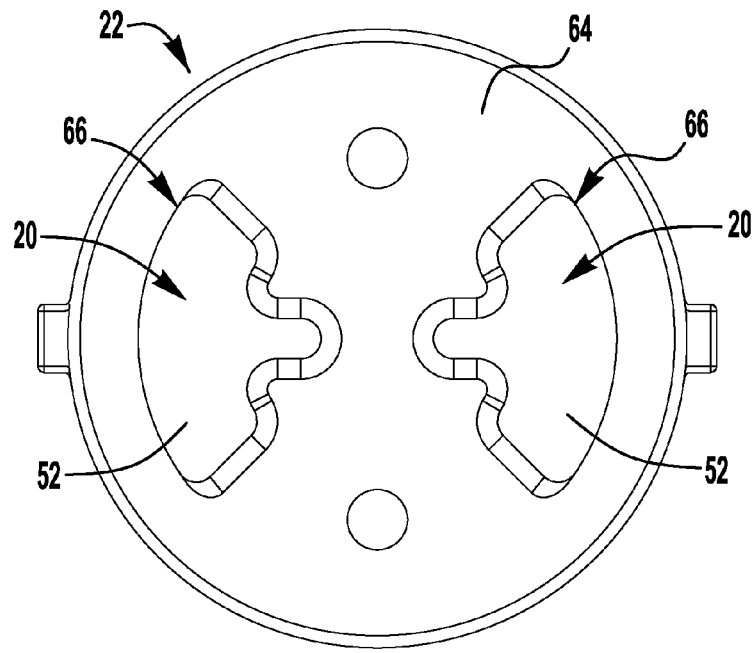
FIGS. 8a-8j are bottom plan views of the moveable disk of FIGS. 6a-6d and the fixed disk of FIGS. 7a-7d, as assembled in the cartridge assembly of FIG. 2, at varying degrees of handle and stem rotation
Figure 8B:
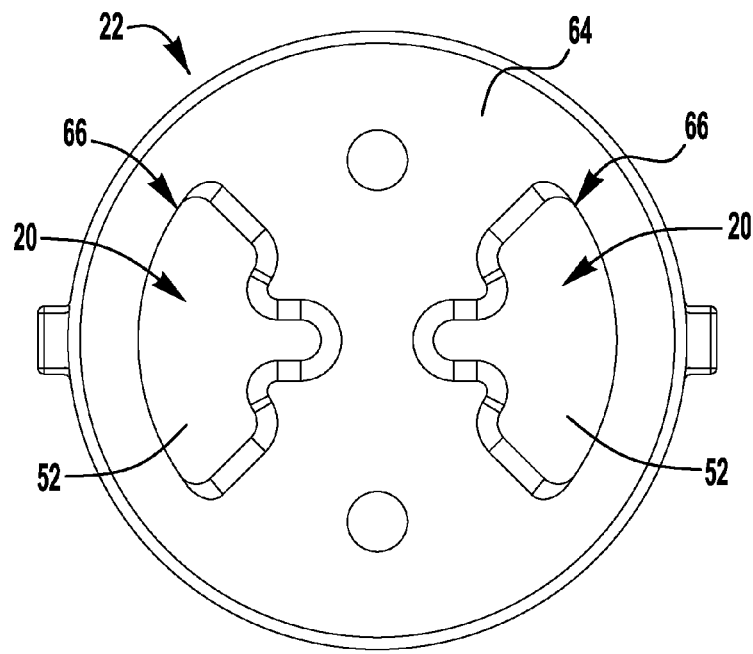
Figure 8C:
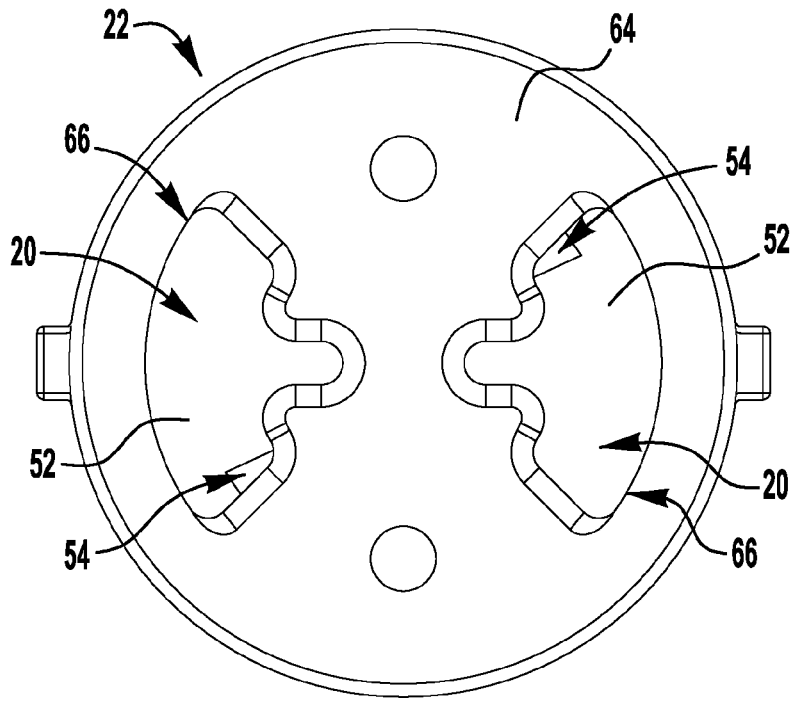
Figure 8D:
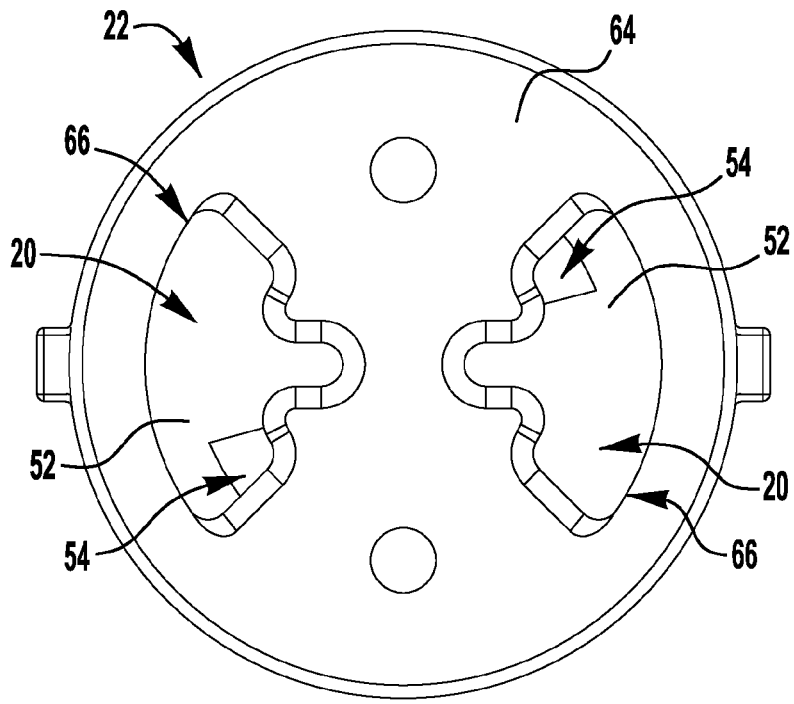
Figure 8E:
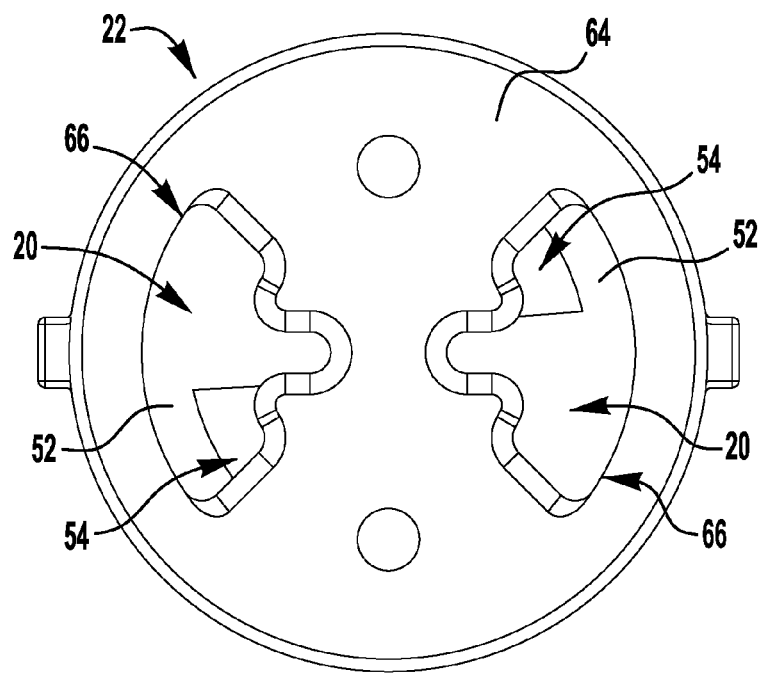
Figure 8F:
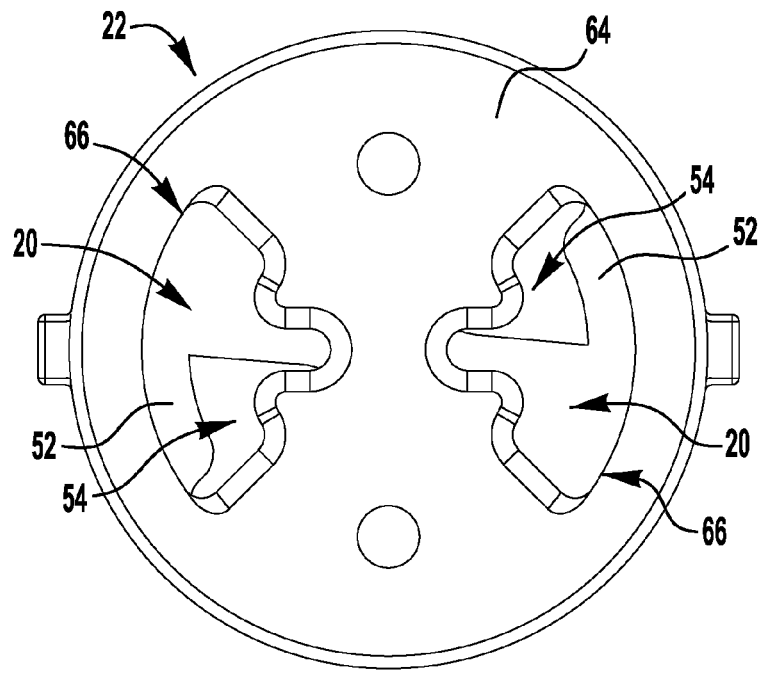
Figure 8G:
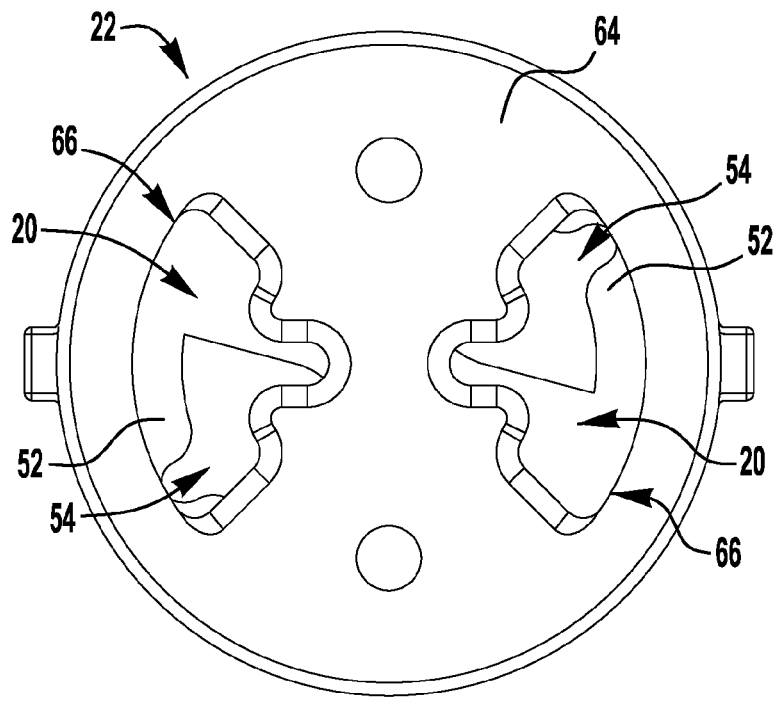
Figure 8H:
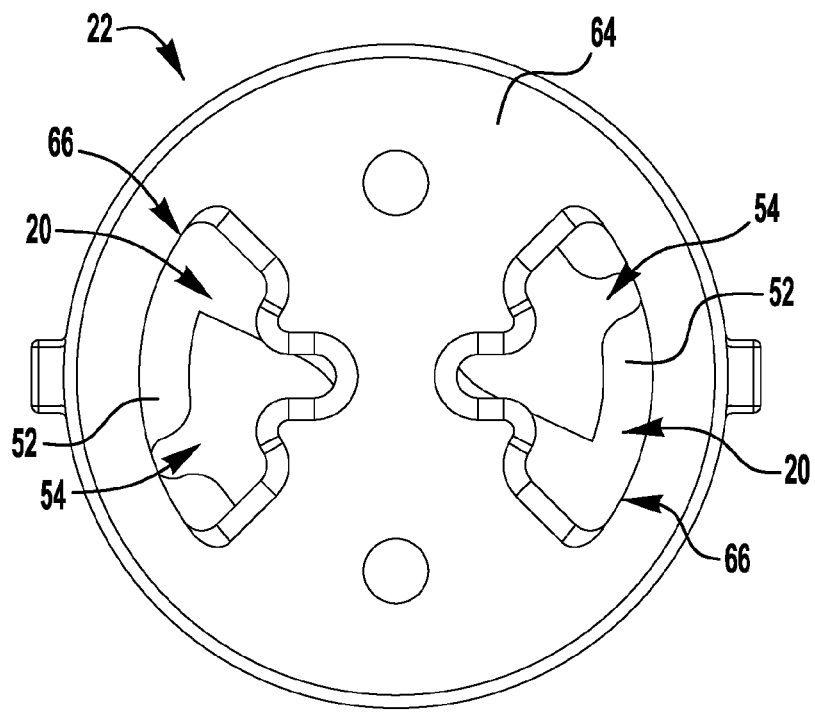
Figure 8I:
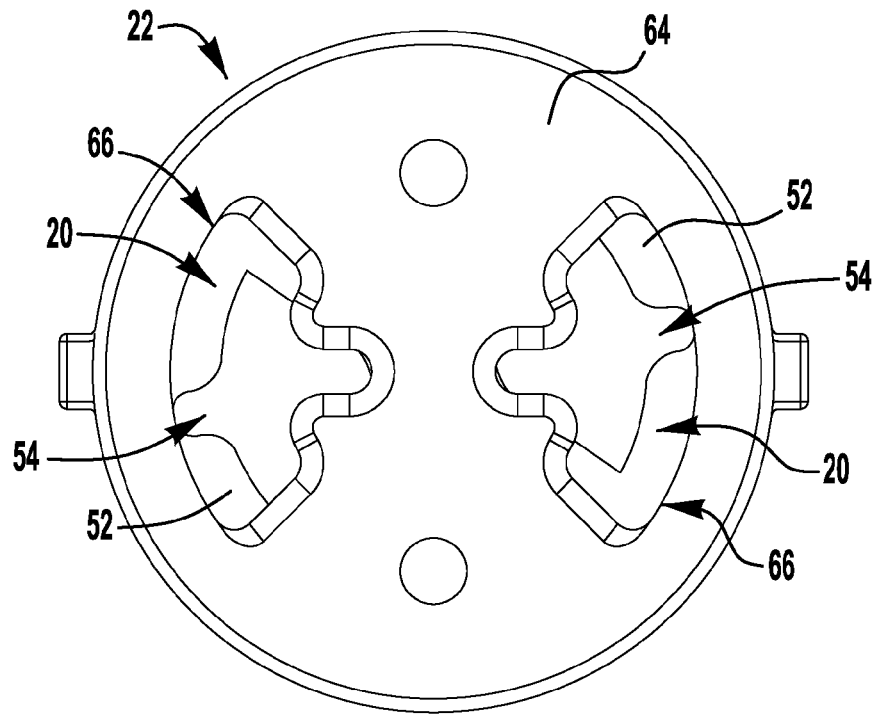
Figure 8J:
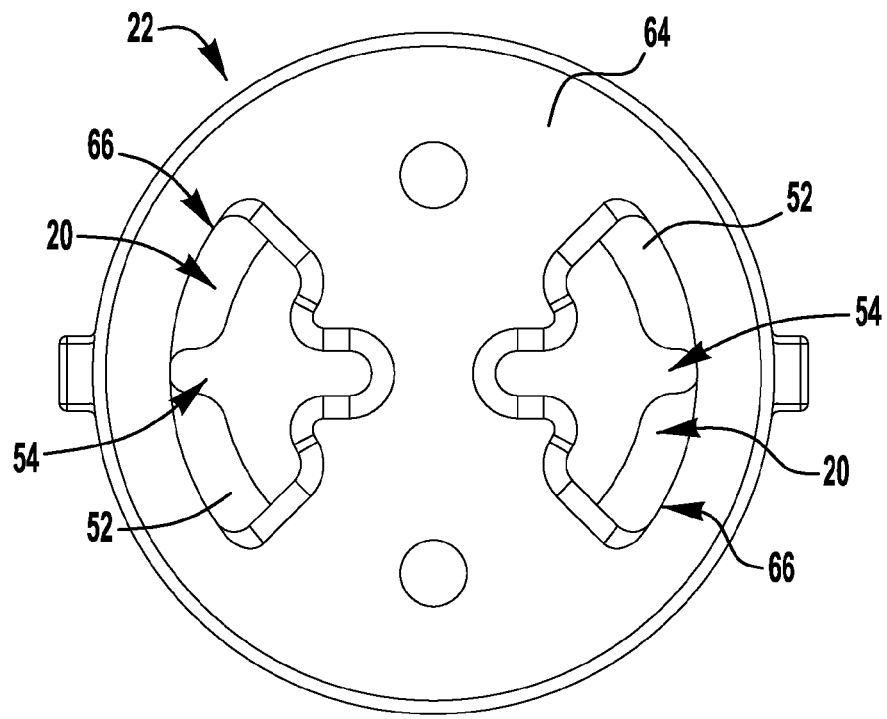

In the illustrated embodiment, as best shown in FIGS. 4 and 5, the cartridge shell 14 includes a first end 30 and a second end 32. The cartridge shell 14 has an exterior surface 34 with a generally cylindrical shape. The cartridge shell 14 has an interior 36 with a central longitudinal axis 38 extending through a center 40 of the interior 36 from the first end 30 to the second end 32. The cartridge shell 14 can be formed of plastic, metal, or any other suitable material.

In the illustrated embodiment, as best shown in FIG. 1, the valve body 12 includes a first end 42 and a second end 44. The valve body 12 has an exterior surface 46 with a generally cylindrical shape. The valve body 12 has an interior surface 48 with a generally cylindrical shape. The interior surface 48 of the valve body 12 generally corresponds to the exterior surface 34 of the cartridge shell 14. In an exemplary embodiment, the valve body 12 is for use in a two-handle faucet. The valve body 12 can be formed of plastic, metal, or any other suitable material.

In an exemplary embodiment, as illustrated in FIGS. 6a-6d, the moveable disk 20 includes a top side 50 and a bottom side 52. Additionally, the moveable disk 20 includes a pair of openings 54 extending from the top side 50 through the bottom side 52. In the illustrated embodiment, the openings 54 include a base portion 56 and a neck portion 58 extending radially outwardly from the base portion 56. The base portion 56 is wider than the neck portion 58. In the illustrated embodiment, the openings 54 are symmetrical across a center line 60 of the openings 54. Since the openings 54 are symmetrical, the moveable disk 20 can be rotated in a clockwise or counterclockwise direction and, thus, can be used in a left-hand or a right-hand installation. In an exemplary embodiment, the moveable disk 20 is formed of ceramic material. In an exemplary embodiment, the moveable disk 20 is formed of aluminum oxide. However, the moveable disk 20 could be formed of other suitable materials.

In an exemplary embodiment, as illustrated in FIGS. 7a-7d, the fixed disk 22 includes a top side 62 and a bottom side 64. Additionally, the fixed disk 22 includes a pair of openings 66 extending from the top side 62 through the bottom side 64. In the illustrated embodiment, the openings 66 include a base portion 68 and a neck portion 70 extending radially inwardly from the base portion 68. The base portion 68 is wider than the neck portion 70. In the illustrated embodiment, the openings 66 are symmetrical across a center line 72 of the openings 66. Since the openings 66 are symmetrical, the fixed disk 22 can be rotated in a clockwise or counterclockwise direction and, thus, can be used in a left-hand or a right-hand installation. In an exemplary embodiment, the fixed disk 22 is formed of ceramic material. In an exemplary embodiment, the fixed disk 22 is formed of aluminum oxide. However, the fixed disk 22 could be formed of other suitable materials.

Figure 2:
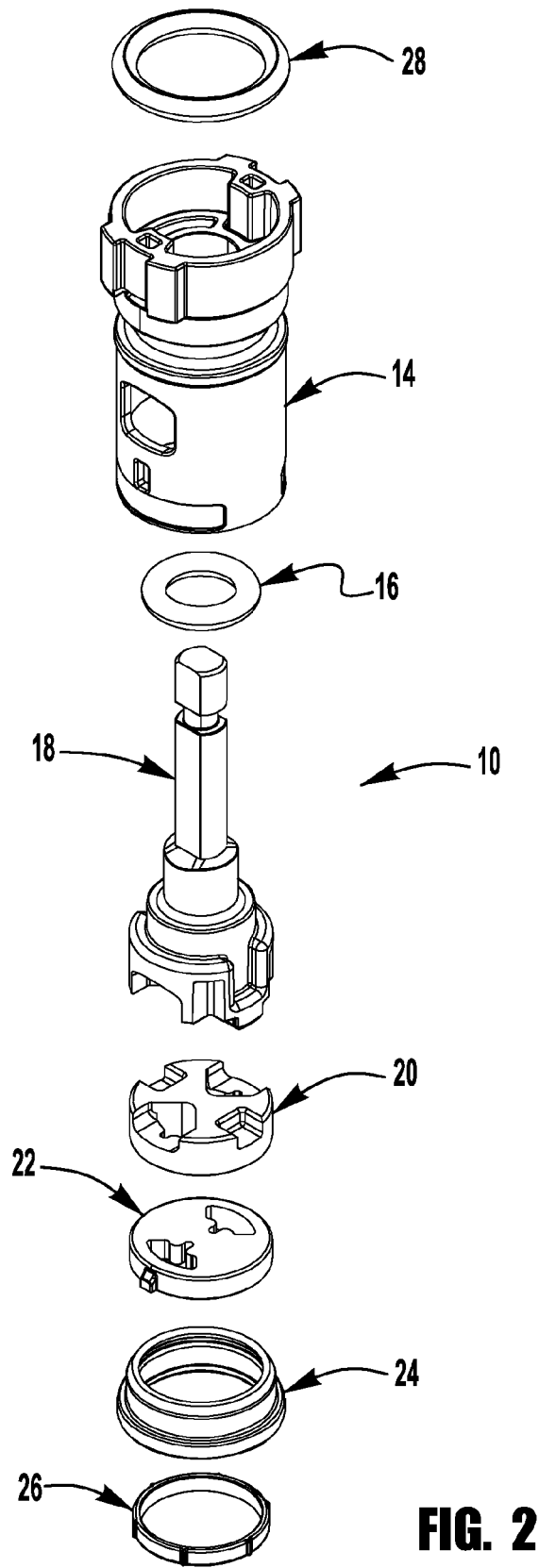
FIG. 2 is an exploded perspective view of the cartridge assembly of FIG. 1, including a moveable disk and a fixed disk.
Figure 3:
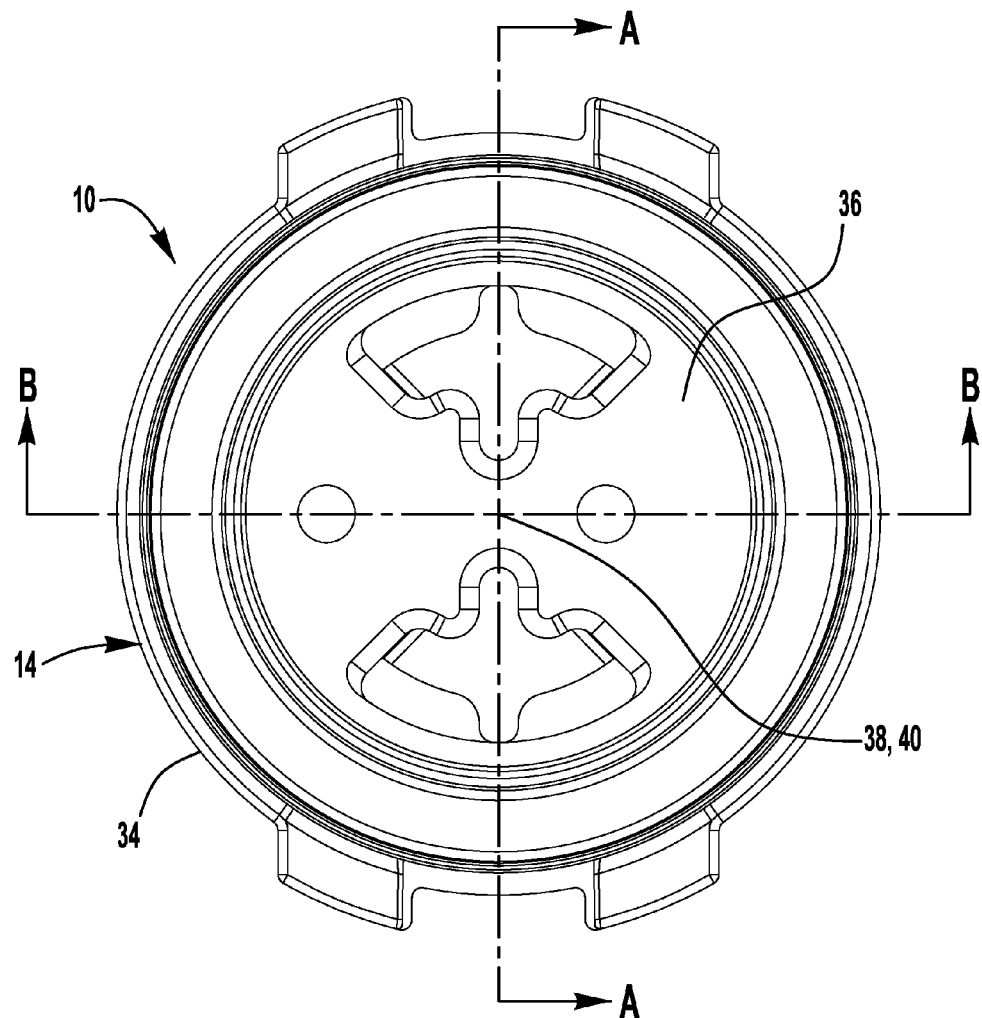
FIG. 3 is a bottom plan view of the cartridge assembly of FIG. 2.

In the illustrated embodiment, as best shown in FIGS. 2 and 4, the cartridge shell 14 includes a pair of openings 74 extending from the interior 36 through the exterior surface 34 between the first end 30 and the second end 32 of the cartridge shell 14. Additionally, the stem 18 includes a first end 76 and a second end 78. The stem 18 includes a pair of recesses 80 near the second end 78 of the stem 18. Further, the moveable disk 20 includes a pair of recesses 82 in the top side 50 adjacent the openings 54 in the moveable disk 20.

In the illustrated embodiment, as best shown in FIGS. 2, 4, and 5, a handle (not shown) is connected to the first end 76 of the stem 18, and the second end 78 of the stem 18 is connected to the top side 50 of the moveable disk 20. Additionally, the bottom side 52 of the moveable disk 20 abuts the top side 62 of the fixed disk 22. Rotation of the handle causes rotation of the stem 18. Rotation of the stem 18 causes rotation of the moveable disk 20. Rotation of the moveable disk 20 relative to the fixed disk 22 controls the flow of fluid (typically, water) through the faucet.

Fluid flowing through the cartridge assembly 10 enters through the base seal 24 and the base seal support 26 in the second end 32 of the cartridge shell 14. Fluid flows through the openings 66 in the fixed disk 22 and through the openings 54 in the moveable disk 20. Fluid then flows through the recesses 82 in the moveable disk 20 and through the recesses 80 in the stem 18. Fluid exits through the openings 74 in the cartridge shell 14.

During operation of the faucet, when the handle and the stem 18 are in the completely closed position at a handle and stem 18 rotation of approximately zero degrees (0°), the openings 54 in the moveable disk 20 and the openings 66 in the fixed disk 22 do not overlap. As the handle and the stem 18 are rotated, the openings 54 in the moveable disk 20 begin to overlap with the openings 66 in the fixed disk 22. As the handle and the stem 18 are continually rotated, the amount of overlap between the openings 54 in the moveable disk 20 and the openings 66 in the fixed disk 22 increases. When the handle and the stem 18 are rotated to a completely open position at a handle and stem 18 rotation of approximately ninety degrees (90°), the openings 54 in the moveable disk 20 are at a maximum overlap with the openings 66 in the fixed disk 22.

FIGS. 8a-8j show the moveable disk 20 and the fixed disk 22 with varying amounts of overlap between the openings 54 in the moveable disk 20 and the openings 66 in the fixed disk 22, at ten degree (10°) increments of handle and stem 18 rotation, starting at the completely closed position at a handle and stem 18 rotation of approximately zero degrees (0°) through the completely open position at the handle and the stem 18 rotation of approximately ninety degrees (90°).

The size and shape of the openings 54 in the moveable disk 20 and the openings 66 in the fixed disk 22 determine the flow rate, the flow modulation, and the particulate passage through the cartridge assembly 10.

The flow rate is the amount of fluid (typically, water) that can flow through the cartridge assembly 10 when the handle and the stem 18 are in an open position. The maximum flow rate is the maximum amount of fluid that can flow through the cartridge assembly 10 when the handle and the stem 18 are in a completely open position. It is desirable to have a high maximum flow rate.

FIG. 9 is a chart showing maximum flow rate data for the cartridge assembly 10, including the moveable disk 20 and the fixed disk 22. The chart shows the maximum flow rate through the cartridge assembly 10, at ten pounds per square inch (10 psi) increments of flowing pressure, starting at approximately zero pounds per square inch (0 psi) of flowing pressure through one-hundred ten pounds per square inch (110 psi) of flowing pressure.

The flow modulation is the ability to control the flow rate over a range of handle and stem 18 positions. It is desirable to accurately control the flow rate over a greater range of handle and stem 18 positions. In an exemplary embodiment, the flow rate can be accurately controlled over a range of at least thirty degrees (30°) of handle and stem 18 rotation.

FIG. 10 is a chart showing flow modulation data for the cartridge assembly 10, including the moveable disk 20 and the fixed disk 22. The chart shows the flow rate through the cartridge assembly 10, at three bars (3 bars) of flowing pressure, at five degree (5°) increments of handle and stem 18 rotation, from the completely closed position at a stem rotation of approximately zero degrees (0°), through the completely open position at a stem rotation of approximately ninety degrees (90°), and back to a completely closed position at a stem rotation of approximately one-hundred eighty degrees (180°). FIG. 11 is a graph showing a flow modulation curve for the cartridge assembly 10, including the moveable disk 20 and the fixed disk 22, based on the flow modulation data of FIG. 10.

The data for FIGS. 9-11 was obtained from tests conducted on the cartridge assembly 10 of FIG. 2, including the moveable disk 20 of FIGS. 6a-6d and the fixed disk 22 of FIGS. 7a-7d. The cartridge assembly 10 was installed in a test fixture. The test fixture was a steel threaded housing that encased the cartridge assembly 10. There was a seal between the cartridge assembly 10 and the inlet of the test fixture, but the outlet was open to atmosphere (i.e., there were no discharge restrictions). The flow rate was measured using a flow bench with a capability of flowing zero to twenty gallons per minute (0-20 GPM).

The particulate passage is the ability to pass particulate through the cartridge assembly 10. It is desirable to pass large particulate through the cartridge assembly 10.

In an exemplary embodiment, the openings 54 in the moveable disk 20 and the openings 66 in the fixed disk 22 are configured so that there are two (2) zones of control over the flow rate, the flow modulation, and the particulate passage, as illustrated in FIGS. 10 and 11. In the first zone, the flow rate increases at a gradual rate, there is a high degree of control over the flow modulation, and there is a limited ability to pass particulate. In the second zone, the flow rate increases at a steep rate, there is a low degree of control over the flow modulation, and there is an expansive ability to pass particulate.

In an exemplary embodiment, the first zone is a range from an open position at a stem 18 rotation of approximately fifteen degrees (15°) to an open position at a stem 18 rotation of approximately forty-five degrees (45°), and the second zone is a range from the open position at the stem 18 rotation of approximately forty-five degrees (45°) to an open position at a stem 18 rotation of approximately seventy-five degrees (75°).

In an exemplary embodiment, the openings 54 in the moveable disk 20 and the openings 66 in the fixed disk 22 are configured so that an average flow rate through the cartridge assembly 10, at three bars (3 bars) of flowing pressure, in the second zone, for each stem 18 rotation of approximately five degrees (5°), is greater than an average flow rate through the cartridge assembly 10, at three bars (3 bars) of flowing pressure, in the first zone, for each stem 18 rotation of approximately five degrees (5°).

In an exemplary embodiment, the openings 54 in the moveable disk 20 and the openings 66 in the fixed disk 22 are configured so that the average flow rate through the cartridge assembly 10, at three bars (3 bars) of flowing pressure, in the second zone, for each stem 18 rotation of approximately five degrees (5°), is at least approximately one-hundred twenty-five percent (125%) of the average flow rate through the cartridge assembly 10, at three bars (3 bars) of flowing pressure, in the first zone, for each stem 18 rotation of approximately five degrees (5°).

In an exemplary embodiment, the openings 54 in the moveable disk 20 and the openings 66 in the fixed disk 22 are configured so that the average flow rate through the cartridge assembly 10, at three bars (3 bars) of flowing pressure, in the second zone, for each stem 18 rotation of approximately five degrees (5°), is at least approximately one-hundred fifty percent (150%) of the average flow rate through the cartridge assembly 10, at three bars (3 bars) of flowing pressure, in the first zone, for each stem 18 rotation of approximately five degrees (5°).

In an exemplary embodiment, the openings 54 in the moveable disk 20 and the openings 66 in the fixed disk 22 are configured so that the average flow rate through the cartridge assembly 10, at three bars (3 bars) of flowing pressure, in the second zone, for each stem 18 rotation of approximately five degrees (5°), is at least approximately one-hundred seventy-five percent (175%) of the average flow rate through the cartridge assembly 10, at three bars (3 bars) of flowing pressure, in the first zone, for each stem 18 rotation of approximately five degrees (5°).

In an exemplary embodiment, the openings 54 in the moveable disk 20 and the openings 66 in the fixed disk 22 are configured so that the maximum flow rate through the cartridge assembly 10, at three bars (3 bars) of flowing pressure, at the completely open position at a stem 18 rotation of approximately ninety degrees (90°), is approximately six gallons per minute (6 GPM).

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately seventy-five degrees (75°), follows an S-curve, as illustrated in FIG. 11.

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately forty-five degrees (45°), increases along a gradual upwardly sloped curve, as illustrated in FIG. 11.

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately forty-five degrees (45°), increases at an average of less than approximately six-tenths gallons per minute (0.6 GPM) for each stem 18 rotation of approximately five degrees (5°).

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately forty-five degrees (45°), increases at an average of less than approximately five-tenths gallons per minute (0.5 GPM) for each stem 18 rotation of approximately five degrees (5°).

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately forty-five degrees (45°), increases at an average of less than approximately four-tenths gallons per minute (0.4 GPM) for each stem 18 rotation of approximately five degrees (5°).

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately fifteen degrees (15°) to the open position at the stem 18 rotation of approximately forty-five degrees (45°), increases at an average of approximately three-tenths gallons per minute (0.3 GPM) for each stem 18 rotation of approximately five degrees (5°).

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately forty-five degrees (45°) to the open position at the stem 18 rotation of approximately seventy-five degrees (75°), increases along a steep upwardly sloped curve, as illustrated in FIG. 11.

In an exemplary embodiment, the openings 54 in the moveable disk 20 and the openings 66 in the fixed disk 22 are configured so that the flow rate through the cartridge assembly 10, at three bars (3 bars) of flowing pressure, from the open position at the stem 18 rotation of approximately forty-five degrees (45°) to the open position at the stem 18 rotation of approximately seventy-five degrees (75°), increases at an average of approximately sixth-tenths gallons per minute (0.6 GPM) for each stem 18 rotation of approximately five degrees (5°).

In an exemplary embodiment, the openings 54 in the moveable disk 20 and the openings 66 in the fixed disk 22 are configured so that the flow rate through the cartridge assembly 10, at three bars (3 bars) of flowing pressure, at the open position at the stem 18 rotation of approximately forty-five degrees (45°), is less than approximately four gallons per minute (4 GPM).

In an exemplary embodiment, the openings 54 in the moveable disk 20 and the openings 66 in the fixed disk 22 are configured so that the flow rate through the cartridge assembly 10, at three bars (3 bars) of flowing pressure, at the open position at the stem 18 rotation of approximately forty-five degrees (45°), is less than approximately three gallons per minute (3 GPM).

In an exemplary embodiment, the openings 54 in the moveable disk 20 and the openings 66 in the fixed disk 22 are configured so that the flow rate through the cartridge assembly 10, at three bars (3 bars) of flowing pressure, at the open position at the stem 18 rotation of approximately forty-five degrees (45°), is less than approximately two gallons per minute (2 GPM).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach three gallons per minute (3 GPM) until an open position at a stem 18 rotation of at least approximately forty degrees (40°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach three gallons per minute (3 GPM) until the open position at the stem 18 rotation of at least approximately forty-five degrees (45°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach three gallons per minute (3 GPM) until an open position at a stem 18 rotation of at least approximately fifty degrees (50°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach four gallons per minute (4 GPM) until the open position at the stem 18 rotation of at least approximately forty-five degrees (45°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach four gallons per minute (4 GPM) until the open position at the stem 18 rotation of at least approximately fifty degrees (50°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach four gallons per minute (4 GPM) until an open position at a stem 18 rotation of at least approximately fifty-five degrees (55°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach five gallons per minute (5 GPM) until the open position at the stem 18 rotation of at least approximately fifty-five degrees (55°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach five gallons per minute (5 GPM) until an open position at a stem 18 rotation of at least approximately sixty degrees (60°).

In an exemplary embodiment, the openings 54 in the moveable disk 20 and the openings 66 in the fixed disk 22 are configured so that the flow rate through the cartridge assembly 10, at three bars (3 bars) of flowing pressure, does not reach five gallons per minute (5 GPM) until an open position at a stem 18 rotation of at least approximately sixty-five degrees (65°).

In an exemplary embodiment, the openings 54 in the moveable disk 20 and the openings 66 in the fixed disk 22 are configured so that particulate in the shape of a circular ball, having a diameter of six-hundredths inch (0.06 in), can pass through the cartridge assembly 10 when the handle and the stem 18 are in the completely open position at a handle and stem 18 rotation of approximately ninety degrees (90°).

In an exemplary embodiment, the openings 54 in the moveable disk 20 and the openings 66 in the fixed disk 22 are configured so that particulate in the shape of a circular ball, having a diameter of seven-hundredths inch (0.07 in), can pass through the cartridge assembly 10 when the handle and the stem 18 are in the completely open position at a handle and stem 18 rotation of approximately ninety degrees (90°).

In an exemplary embodiment, the openings 54 in the moveable disk 20 and the openings 66 in the fixed disk 22 are configured so that particulate in the shape of a circular ball, having a diameter of eight-hundredths inch (0.08 in), can pass through the cartridge assembly 10 when the handle and the stem 18 are in the completely open position at a handle and stem 18 rotation of approximately ninety degrees (90°).

In an exemplary embodiment, the openings 54 in the moveable disk 20 and the openings 66 in the fixed disk 22 are configured so that particulate in the shape of a circular ball, having a diameter of nine-hundredths inch (0.09 in), can pass through the cartridge assembly 10 when the handle and the stem 18 are in the completely open position at a handle and stem 18 rotation of approximately ninety degrees (90°).

In an exemplary embodiment, the openings 54 in the moveable disk 20 and the openings 66 in the fixed disk 22 are configured so that particulate in the shape of a circular ball, having a diameter of one-tenth inch (0.1 in), can pass through the cartridge assembly 10 when the handle and the stem 18 are in the completely open position at a handle and stem 18 rotation of approximately ninety degrees (90°).

One of ordinary skill in the art will now appreciate that the present invention provides a cartridge assembly for a faucet that provides improved flow rate, flow modulation, and particulate passage. Although the present invention has been shown and described with reference to particular embodiments, equivalent alterations and modifications will occur to those skill in the art upon reading and understanding this specification. The present invention includes all such equivalent alterations and modifications and is limited only by the scope of the following claims in light of their full scope of equivalents.

What is claimed is:

1. A cartridge assembly for a faucet, the cartridge assembly comprising:
    a cartridge shell, the cartridge shell including a first end and a second end, the cartridge shell having an exterior surface, the cartridge shell having an interior, the cartridge shell including a pair of openings extending from the interior through the exterior surface between the first end and the second end;
    a stem, the stem operable to be at least partially disposed within the cartridge shell;
    a moveable disk, the moveable disk operable to be disposed within the cartridge shell, the moveable disk including a top side and a bottom side, the moveable disk further including a pair of openings extending from the top side through the bottom side; and
    a fixed disk, the fixed disk operable to be disposed within the cartridge shell, the fixed disk including a top side and a bottom side, the fixed disk further including a pair of openings extending from the top side through the bottom side;
    wherein the stem is operable to be connected to the moveable disk so that rotation of the stem causes rotation of the moveable disk;
    wherein the bottom side of the moveable disk is operable to abut the top side of the fixed disk;
    wherein flow through the cartridge assembly flows through the openings in the fixed disk and through the openings in the moveable disk and exits through the openings in the cartridge shell;
    wherein, in a completely open position, the openings in the moveable disk are at a maximum overlap with the openings in the fixed disk; and
    wherein, in a completely open position, the openings in the moveable disk only partially overlap the openings in the fixed disk.

2. The cartridge assembly of claim 1, wherein the openings in the moveable disk and the openings in the fixed disk are configured so that the flow rate through the cartridge assembly, at three bars of flowing pressure, from the open position at the stem rotation of approximately fifteen degrees to an open position at a stem rotation of approximately forty-five degrees, increases at an average of less than approximately six-tenths gallons per minute for each stem rotation of approximately five degrees.

3. The cartridge assembly of claim 1, wherein the openings in the moveable disk and the openings in the fixed disk are configured so that the flow rate through the cartridge assembly, at three bars of flowing pressure, from the open position at the stem rotation of approximately fifteen degrees to an open position at a stem rotation of approximately forty-five degrees, increases at an average of approximately three-tenths gallons per minute for each stem rotation of approximately five degrees.

4. The cartridge assembly of claim 1, wherein the openings in the moveable disk and the openings in the fixed disk are configured so that an average flow rate through the cartridge assembly, at three bars of flowing pressure, from an open position at a stem rotation of approximately forty-five degrees to the open position at the stem rotation of approximately seventy-five degrees, for each stem rotation of approximately five degrees, is greater than an average flow rate through the cartridge assembly, at three bars of flowing pressure, from the open position at the stem rotation of approximately fifteen degrees to the open position at the stem rotation of approximately forty-five degrees, for each stem rotation of approximately five degrees.

5. The cartridge assembly of claim 1, wherein the openings in the moveable disk and the openings in the fixed disk are configured so that an average flow rate through the cartridge assembly, at three bars of flowing pressure, from an open position at a stem rotation of approximately forty-five degrees to the open position at the stem rotation of approximately seventy-five degrees, for each stem rotation of approximately five degrees, is at least approximately one-hundred seventy-five percent an average flow rate through the cartridge assembly, at three bars of flowing pressure, from the open position at the stem rotation of approximately fifteen degrees to the open position at the stem rotation of approximately forty-five degrees, for each stem rotation of approximately five degrees.

6. The cartridge assembly of claim 1, wherein the openings in the moveable disk and the openings in the fixed disk are configured so that a flow rate through the cartridge assembly, at three bars of flowing pressure, at an open position at a stem rotation of approximately forty-five degrees, is less than approximately four gallons per minute.

7. The cartridge assembly of claim 1, wherein the openings in the moveable disk and the openings in the fixed disk are configured so that a flow rate through the cartridge assembly, at three bars of flowing pressure, at an open position at a stem rotation of approximately forty-five degrees, is less than approximately two gallons per minute.

8. The cartridge assembly of claim 1, wherein the openings in the moveable disk and the openings in the fixed disk are configured so that a flow rate through the cartridge assembly, at three bars of flowing pressure, does not reach three gallons per minute until an open position at a stem rotation of at least approximately forty degrees.

9. The cartridge assembly of claim 1, wherein the openings in the moveable disk and the openings in the fixed disk are configured so that a flow rate through the cartridge assembly, at three bars of flowing pressure, does not reach four gallons per minute until an open position at a stem rotation of at least approximately forty-five degrees.

10. The cartridge assembly of claim 1, wherein the openings in the moveable disk and the openings in the fixed disk are configured so that a flow rate through the cartridge assembly, at three bars of flowing pressure, does not reach five gallons per minute until an open position at a stem rotation of at least approximately fifty-five degrees.

11. The cartridge assembly of claim 1, wherein the openings in the moveable disk and the openings in the fixed disk are configured so that particulate in the shape of a circular ball, having a diameter of approximately six-hundredths inch, can pass through the cartridge assembly when the stem is in a completely open position at a stem rotation of approximately ninety degrees.

12. The cartridge assembly of claim 1, wherein the openings in the moveable disk and the openings in the fixed disk are configured so that particulate in the shape of a circular ball, having a diameter of approximately eight-hundredths inch, can pass through the cartridge assembly when the stem is in a completely open position at a stem rotation of approximately ninety degrees.

13. The cartridge assembly of claim 1,
wherein the openings in the moveable disk include a base portion and a neck portion extending radially from the base portion, the base portion being wider than the neck portion; and
wherein the openings in the fixed disk include a base portion and a neck portion extending radially from the base portion, the base portion being wider than the neck portion.

14. The cartridge assembly of claim 13, wherein, in a completely open position, the base portion of each opening in the moveable disk is radially opposed to the base portion of each overlapping opening in the fixed disk and the neck portion of each opening in the moveable disk is radially opposed to the neck portion of each overlapping opening in the fixed disk.

15. A cartridge assembly for a faucet, the cartridge assembly comprising:
a cartridge shell, the cartridge shell including a first end and a second end, the cartridge shell having an exterior surface, the cartridge shell having an interior, the cartridge shell including a pair of openings extending from the interior through the exterior surface between the first end and the second end;
a stem, the stem operable to be at least partially disposed within the cartridge shell;
a moveable disk, the moveable disk operable to be disposed within the cartridge shell, the moveable disk including a top side and a bottom side, the moveable disk further including a pair of openings extending from the top side through the bottom side, the openings in the moveable disk including a base portion and a neck portion extending radially from the base portion, the base portion being wider than the neck portion;
a fixed disk, the fixed disk operable to be disposed within the cartridge shell, the fixed disk including a top side and a bottom side, the fixed disk further including a pair of openings extending from the top side through the bottom side, the openings in the fixed disk including a base portion and a neck portion extending radially from the base portion, the base portion being wider than the neck portion;
wherein the stem is operable to be connected to the moveable disk so that rotation of the stem causes rotation of the moveable disk;
wherein the bottom side of the moveable disk is operable to abut the top side of the fixed disk;
wherein flow through the cartridge assembly flows through the openings in the fixed disk and through the openings in the moveable disk and exits through the openings in the cartridge shell; and wherein, in a completely open position, the base portion of each opening in the moveable disk is radially opposed to the base portion of each overlapping opening in the fixed disk and the neck portion of each opening in the moveable disk is radially opposed to the neck portion of each overlapping opening in the fixed disk.

16. The cartridge assembly of claim 15, wherein the openings in the moveable disk and the openings in the fixed disk are configured so that the flow rate through the cartridge assembly, at three bars of flowing pressure, from the open position at the stem rotation of approximately fifteen degrees to the open position at the stem rotation of approximately forty-five degrees, increases at an average of less than approximately six-tenths gallons per minute for each stem rotation of approximately five degrees.

17. The cartridge assembly of claim 15, wherein the openings in the moveable disk and the openings in the fixed disk are configured so that the flow rate through the cartridge assembly, at three bars of flowing pressure, from the open position at the stem rotation of approximately fifteen degrees to the open position at the stem rotation of approximately forty-five degrees, increases at an average of approximately three-tenths gallons per minute for each stem rotation of approximately five degrees.

18. The cartridge assembly of claim 15, wherein the openings in the moveable disk and the openings in the fixed disk are configured so that an average flow rate through the cartridge assembly, at three bars of flowing pressure, in the second zone, for each stem rotation of approximately five degrees, is greater than an average flow rate through the cartridge assembly, at three bars of flowing pressure, in the first zone, for each stem rotation of approximately five degrees.

19. The cartridge assembly of claim 15, wherein the openings in the moveable disk and the openings in the fixed disk are configured so that an average flow rate through the cartridge assembly, at three bars of flowing pressure, in the second zone, for each stem rotation of approximately five degrees, is at least approximately one-hundred seventy-five percent an average flow rate through the cartridge assembly, at three bars of flowing pressure, in the first zone, for each stem rotation of approximately five degrees.

20. A cartridge assembly for a faucet, the cartridge assembly comprising:
   a cartridge shell, the cartridge shell including a first end and a second end, the cartridge shell having an exterior surface, the cartridge shell having an interior, the cartridge shell including a pair of openings extending from the interior through the exterior surface between the first end and the second end;
   a stem, the stem operable to be at least partially disposed within the cartridge shell;
   a moveable disk, the moveable disk operable to be disposed within the cartridge shell, the moveable disk including a top side and a bottom side, the moveable disk further including a pair of openings extending from the top side through the bottom side, the openings in the moveable disk including a base portion and a neck portion extending radially from the base portion, the base portion being wider than the neck portion and forming a plateau between the base portion and the neck portion;
   a fixed disk, the fixed disk operable to be disposed within the cartridge shell, the fixed disk including a top side and a bottom side, the fixed disk further including a pair of openings extending from the top side through the bottom side, the openings in the fixed disk including a base portion and a neck portion extending radially from the base portion, the base portion being wider than the neck portion and forming a plateau between the base portion and the neck portion;
   wherein the stem is operable to be connected to the moveable disk so that rotation of the stem causes rotation of the moveable disk;
   wherein the bottom side of the moveable disk is operable to abut the top side of the fixed disk; and
   wherein flow through the cartridge assembly flows through the openings in the fixed disk and through the openings in the moveable disk and exits through the openings in the cartridge shell.

21. The cartridge assembly of claim 20, wherein the openings in the moveable disk and the openings in the fixed disk are configured so that the flow rate through the cartridge assembly, at three bars of flowing pressure, in the first zone, increases at an average of less than approximately six-tenths gallons per minute for each stem rotation of approximately five degrees.

22. The cartridge assembly of claim 20, wherein the openings in the moveable disk and the openings in the fixed disk are configured so that the flow rate through the cartridge assembly, at three bars of flowing pressure, in the first zone, increases at an average of approximately three-tenths gallons per minute for each stem rotation of approximately five degrees.

23. The cartridge assembly of claim 20, wherein the openings in the moveable disk and the openings in the fixed disk are configured so that an average flow rate through the cartridge assembly, at three bars of flowing pressure, in the second zone, for each stem rotation of approximately five degrees, is greater than an average flow rate through the cartridge assembly, at three bars of flowing pressure, in the first zone, for each stem rotation of approximately five degrees.

24. The cartridge assembly of claim 20, wherein the openings in the moveable disk and the openings in the fixed disk are configured so that an average flow rate through the cartridge assembly, at three bars of flowing pressure, in the second zone, for each stem rotation of approximately five degrees, is at least approximately one-hundred seventy-five percent an average flow rate through the cartridge assembly, at three bars of flowing pressure, in the first zone, for each stem rotation of approximately five degrees.

* * * * *